Sept. 30, 1952     H. E. SCHUTZER ET AL     2,612,386
WHEELED ATTACHMENT FOR HAND TRUCKS
Filed May 20, 1948     2 SHEETS—SHEET 2
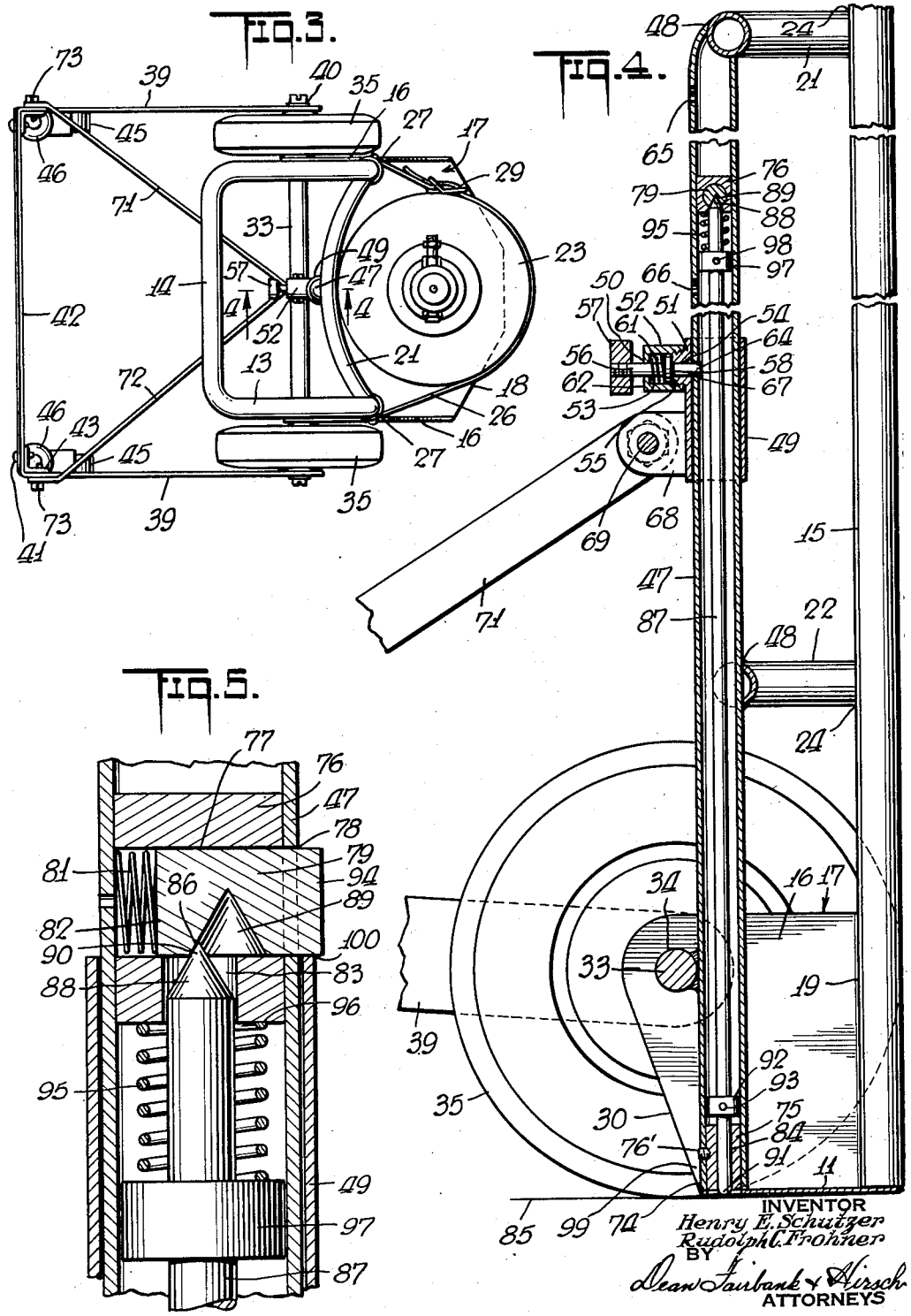

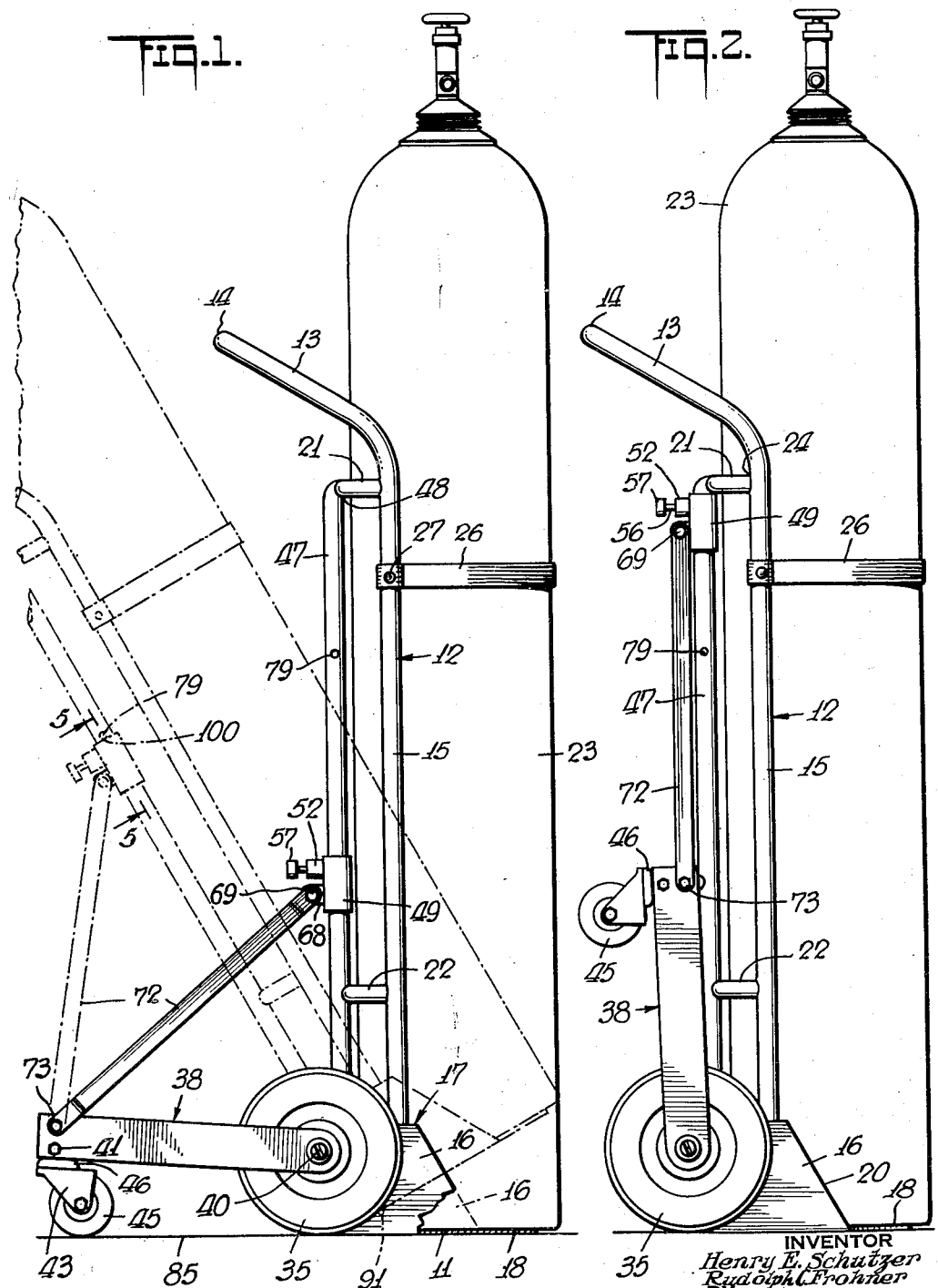

Patented Sept. 30, 1952

2,612,386

UNITED STATES PATENT OFFICE 2,612,386

WHEELED ATTACHMENT FOR HAND TRUCKS

Henry E. Schutzer, New York, and Rudolph C. Frohner, Brooklyn, N. Y., assignors to Oxygen Equipment Mfg. Co., a corporation of New York Application May 20, 1948, Serial No. 28,123

5 Claims. (Cl. 280—54)

This invention relates to hand trucks more particularly of the type used to transport cylinders of compressed gas.

It is among the objects of the invention to provide a hand truck that is neat, relatively compact and light in weight of but few relatively inexpensive parts of substantially only flat and tubular stock, which parts may readily be assembled and are not likely to get out of order, that will enable a cylindrical tank to be placed thereon with but a minimum of exertion and will support such tank in an upright position when in use, and when so supporting such tank will do so without danger of the latter tilting and falling, which truck may readily be adjusted with the cylindrical tank thereon, so that the latter is rearwardly inclined to facilitate transport thereof from place to place, and which adjustment may be accomplished without danger of collapse of the hand truck, which will remain in inclined position without any exertion or strain on the part of the user, that may readily be moved from place to place with but the minimum of effort and when desired may be adjusted so as to occupy but a minimum of space to facilitate storage of the hand truck or its use in a small space and also to enable it to be used in the manner of a conventional two-wheeled hand truck.

According to the invention the hand truck comprises a carriage and a cradle pivotally mounted thereon and arranged to be either in upright position for service or in inclined cradling position for transport. The cradle is selectively maintained in one or the other of said positions by an adjustable brace connected between the cradle and the carriage and having a slidable adjustment along one of the same, a safety stop limiting the position of the brace for defining the inclination of the cradle in transport position. In a preferred embodiment it is the cradle that carries the slidable end of the brace and that has the safety stop. Preferably the truck affords means to permit pivoting the carriage inward to lie against the cradle for storage or shipping of the truck. To permit slidable displacement of the brace end to the latter position the safety stop is movable out of the path of obstruction. Such removability may be effected by hand but preferably is automatically controlled by actuator means moved into safety stop releasing position by contact thereof with the floor when in vertical position.

In the accompanying drawings in which are shown one or more of various possible embodiments of the several features of the invention, Fig. 1 is a side elevational view of the hand truck showing the latter in full lines with the support frame acting as a stabilizer and in dot and dash lines with the cradle in inclined or transport position, Fig. 2 is a view similar to Fig. 1 showing the support frame in inoperative position, Fig. 3 is a plan view of the hand truck shown in full lines in Fig. 1, Fig. 4 is a sectional view on a larger scale taken along line 4—4 of Fig. 3, and Fig. 5 is a sectional view of a detail on a greatly enlarged scale, taken along line 5—5 of Fig. 1.

Referring now to the drawings, the hand truck comprises a cradle including a substantially U-shaped frame 12, preferably of tubular stock such as steel, aluminum alloy or other strong rigid metal, the upper end of the legs 15 of which are rearwardly inclined as at 13 so that the cross piece 14 thereof forms a handle.

The legs 15 of the frame 12 are affixed at their lower ends as by welding as at 19, to the upright side walls 16 of a substantially U-shaped base 17, the cross piece 11 of said base extending slightly beyond the forward edges 20 of said walls as at 18.

Affixed to the legs 15 of the frame as by welding as at 24 and extending therebetween at right angles thereto, are concave cross bars 21 and 22 also preferably of tubular stock and positioned parallel to one another and spaced along said legs 15, the frame 12, concave cross bars 21 and 22, and base 17 forming a cradle for the cylindrical tank 23 as shown in the drawings.

In order to retain tank 23 on its base 17 against cross bars 21 and 22, a retaining strap 26 is preferably provided, affixed at each end respectively to legs 15 as at 27 and provided with a buckle 29 to facilitate adjustment of the length of the strap so that it may be used for different diameter tanks.

The hand truck has an axle 33 journalled in transversely aligned openings 34 through the rear of the upright walls 16 near the upper edge thereof and mounting at each protruding end thereof, a wheel 35 preferably having a pneumatic puncture proof rubber tire thereon. The rear edge 30 of each of said walls 16 slopes inwardly to cross piece 11, as shown in Fig. 4, for the purpose hereinafter set forth.

Extending rearwardly from the cradle is a substantially U-shaped support frame 38, the free ends of the legs 39 of which straddle wheels 35 and are pivotally connected to the respective ends of axle 33 as at 40. Affixed by screws 41 at each corner of support frame 38 adjacent cross bar 42 thereof, is a bracket 43 which mounts a caster 45, preferably in a ball bearing 46, to facilitate swiveling of such caster through an arc of 360 degrees. Thus the frame 38 with casters 45 thereon and the axle 33 with wheels 35 serve as a carriage for the cradle to facilitate movement thereof.

In order to retain the pivoted support frame 38 in fixed position with respect to the cradle, a tube 47 is provided extending parallel to and midway between the legs 15 of the cradle and affixed as by welding as at 48 to the rear of cross pieces 21 and 22 at the center thereof.

A latch mechanism is provided comprising a sleeve 49, encompassing tube 47 and slidably mounted thereon, the tube serving as a track for said sleeve. The sleeve 49 has an externally threaded nipple 51 near the top thereof, rigid therewith and extending at right angles thereto. Threaded on said nipple 51 is a cap 52, the bore 53 of which is of slightly greater diameter than the bore 54 of nipple 51, thereby forming a shoulder 55, as shown in Fig. 4.

A latch pin 56 is provided, positioned in bores 53 and 54 of cap 52 and nipple 51, respectively, extending at its outer end through an opening 50 in said cap 52 and having a knob 57 affixed on said outer end to facilitate the actuation of said latch pin. A coil spring 61 is positioned in bore 53, encompassing latch pin 56. The spring is compressed between a collar 58 rigidly affixed to latch pin 56 in bore 53 adjacent shoulder 55, and the inturned flange 62 about opening 59 of cap 52, thereby normally urging said latch pin toward tube 47, shoulder 55 limiting the inward movement of said latch pin.

As shown in Fig. 4, the latch pin 56 is of such length that with collar 58 seated against shoulder 55, the inner end 64 of the pin can enter one of the adjustment openings 65, 66 or 67, provided in tube 47 for the purpose hereinafter set forth, thereby securely retaining sleeve 49 in a selected position on tube 47.

Aligned with the nipple 51, near the lower end of sleeve 49 and rigid therewith, is an ear 68 to which is pivotally connected as at 69 one end of each of a pair of braces 71 and 72 which diverge from said ear 68 and are pivotally connected at their other ends as at 73 to the corners of the support frame 38 adjacent the ends of the cross piece 42 thereof.

To limit the movement of sleeve 49 on tube 47 when the hand truck is adjusted from the position shown in full lines in Fig. 1 to the position shown in dot and dash lines, a safety stop has been incorporated in the device. To this end, the lower end 74 of the tube 47, which is substantially flush with the cross piece 11 of base 17 has a bushing 75 affixed therein by set screw 76'. A second bushing 76 is also provided, affixed as by force fit in tube 47 above bushing 75 and spaced from the latter by approximately three-quarters of the length of the tube 47.

Bushing 76 has a transverse bore 77 therethrough aligned with an opening 78 of corresponding diameter in the wall of tube 47. A plunger or stop 79 is slidably mounted in transverse bore 77 and normally urged through opening 78 in tube 47 by a coil spring 81 seated in said bore 77 between the inner end 82 of the stop 79 and the wall of the tube 47. Bushing 76 also has a vertical bore 83 which extends through the lower end thereof into bore 77 and is aligned with the bore 84 of bushing 75.

Slidably mounted in bores 83 and 84 of bushings 76 and 75, respectively, is an actuating rod 87, the upper end of which is conical as at 88 to conform to a complementary conical depression 89 in the underface of stop 79.

The length of actuating rod 87 is such that with the lower end 91 thereof flush with the under side of the cross piece 11 of base 17 and resting on floor 85, the conical upper end 88 thereof will be seated in conical depression 89 as shown in Fig. 4. Actuating rod 87 near its lower end 91 has a collar 92 affixed thereon by a set screw 93. The collar is so spaced from such lower end 91 that when it is seated on bushing 75, the tip 90 of the conical end 88 of actuating rod 87 will be abutting against the bottom of the inclined wall 86 of the conical depression 89 in stop 79 as shown in Fig. 5, thereby retaining said stop 79 in bore 77, yet with the end 94 thereof extending through opening 78 in tube 47.

In order to urge the actuating rod downward, a coil spring 95 is provided encompassing actuating rod 87, seated at its upper end against the under face of bushing 76 as at 96 and at its lower end against collar 97 affixed to rod 87 by set screw 98.

*Operation*

To use the hand truck with the support frame 38 in the position shown in Fig. 1, with the cross piece 11 of base 17 resting on the floor 85, a cylindrical tank 23 may readily be placed on base 17 in upright position against the concave cross bars 21 and 22 and secured in place by tightening strap 26.

With cross piece 11 of base 17 against the floor 85 as shown in Fig. 4, the end 91 of the actuator rod 87 will also be against the floor and hence actuator rod 87 will have been moved upwardly in tube 47 against the tension of coil spring 95. As a consequence, the conical end 88 of the rod 87 will have been forced into the conical depression 89 in stop 79 from the position shown in Fig. 5 to the position shown in Fig. 4, thereby camming said stop inwardly into bore 77 against the tension of coil spring 81 until the protruding end 94 of stop 79 is flush with the wall of tube 47.

In order to transport the tank 23 which is best accomplished when the cradle is in the position shown in dot and dash lines in Fig. 1, knob 57 of the latch mechanism is pulled to withdraw the end 64 of latch pin 56 from opening 67 in which it is normally positioned when the cradle is in upright position as shown in Fig. 4. Simultaneously the cradle is pivoted about axle 33 by pulling back on handle 14. As the rear edges 30 of the side walls 16 are inclined inwardly as shown in Fig. 4, the lower rear corners 99 thereof will readily clear the floor as the base 17 is pivoted about axle 33, and hence will not impede the pivoting of the cradle to transport position.

With the latch pin withdrawn, sleeve 49 may readily be moved upwardly along tube 47 until latch pin 56 is aligned with opening 66 therein at which point the end 64 of the latch pin will snap into opening 66 under the urging of tensed coil spring 61. As the base 17 is moved away from the floor 85 during pivoting of the cradle about axle 33, the lower end 74 of tube 47 will also be moved from the floor, thereby enabling spring 95 to force actuator rod 87 downward until collar 92 rests on bushing 75.

In so moving, the conical end 88 of the actuator rod will be withdrawn from conical depression 89 in stop 79, thereby enabling coil spring 81 in bore 77 to force stop 79 transversely of tube 47 so that its end 94 protrudes from the wall of said tube.

If not for the provision of the stop 79, if the latch pin 56 should have failed to enter opening 66, there would be nothing to prevent sleeve 49 from riding to the top of tube 47. As the tank 23 is of considerable weight, it would take a great deal of strength on the part of the operator to hold the cradle in inclined position, as the support frame 38 would not be rigidly affixed with respect to the cradle and hence would give no support.

If the operator should not be possessed of such required strength, which is likely when the hand truck is used by female nurses in a hospital to transport tanks of oxygen, the hand truck might collapse against the nurse and in addition the impact of the oxygen tank on the floor might result in an explosion with resultant injury to the nurse and to bystanders.

Such dangers are completely eliminated by the provision of stop 79 above described. For when the cradle is moved to inclined position and the sleeve 49 slides along the tube 47, it will abut against the stop as at 100 as shown in dot and dash lines in Fig. 1 and also in Fig. 5, and thus prevent further movement of the sleeve 49 and rigidly retain the support frame 38 in place with respect to the cradle. The stop 79 is so positioned in the tube 47 that when sleeve 49 abuts thereagainst as at 100, the end 64 of latch pin 56 will be aligned with opening 66 in the tube 47 and forced therein by coil spring 61.

The truck when in the transport position shown in dot and dash lines in Fig. 1 may readily be moved from place to place, the casters 45, which may be swiveled in a 360 degree arc and which are mounted in ball bearings 46, permitting ready maneuverability of the truck with but the minimum of exertion on the part of the operator.

In hospital use of oxygen tanks, it is desirable that the tank be in upright position when in use to facilitate mounting the regulating valves (not shown) on the top of the tank. To this end, after the hand truck has been moved to the desired position, usually beside the bed of a patient, the operator need merely pull on knob 57 to withdraw the end 64 of latch pin 56 from opening 66 while at the same time pushing on handle 14 to pivot the cradle to upright position.

As the end 94 of stop 79 will be abutting against sleeve 49, there will be no danger of the latter sliding up tube 47, resulting in the possible collapse of the hand truck with the consequent dangers heretofore described. The end 94 of stop 79 will protrude from tube 47 until the cross piece 11 of base 17 is resting on the floor, at which time the cradle will be in an upright, stable position and only then will actuating rod 87 be moved upwardly to retract stop 79 in the manner heretofore described. With the cradle in such upright position and with support frame 38 substantially parallel to the floor 85, the casters 45 will also rest on the floor and latch pin 56 will be aligned with opening 67 and enter the latter as shown in Fig. 4, securely to retain the support frame 38 in position with respect to the cradle.

The support frame when in such position with respect to the cradle will act as a stabilizer and prevent the tank 23 from tilting and falling, and injury to the nurse and bystanders is avoided.

If it is desired to store or to use the hand truck in a limited space or to use it to transport articles in the manner of a conventional two-wheeled hand truck, the support frame 38 may be pivoted upwardly about axle 33 so that it is substantially parallel to the cradle as shown in Fig. 2. To this end, with the cradle in upright position, the user need merely pull on knob 57 to withdraw latch pin 56 from opening 67 and slide sleeve 49 to the top of tube 47 so that latch pin 56 is aligned with opening 65 whereupon the tensed coil spring 61 will force the end 64 of latch pin 56 into opening 65 to retain the support frame in inoperative position as shown in Fig. 2. As stop 79 has been retracted in the manner heretofore described when the cradle is in upright position, there will be no obstruction to impede the movement of sleeve 49.

It is to be noted that although the hand truck is shown and described for use with a single cylindrical tank, the same principles herein set forth could be applied to a hand truck adapted to carry a plurality of cylindrical tanks or to a hand truck adapted to carry trunks, boxes, packages or other articles.

Thus by the construction herein described, an efficient hand truck has been provided that may be used in hospitals, factories, railroad stations, hotels or similar establishments where it is necessary to transport heavy articles from place to place and such transport may be accomplished without danger of injury to the operator and with but the minimum amount of exertion.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described our invention what we claim as new and desire to secure by Letters Patent of the United States is:

1. A hand truck comprising a cradle, wheels rotatably mounted at the lower end of said cradle, support means connected to said cradle and pivotally displaceable with respect thereto, wheel means on said support means, a track comprising a hollow tube extending longitudinally of said cradle and rigid therewith, a sleeve slidably mounted on said tube and operatively connected to said support means to displace the latter with respect to said cradle, whereby said cradle may be moved to an inclined position, a safety stop normally positioned in said tube and movable therefrom at right angles thereto into the path of movement of said sleeve to limit the movement of the latter on said tube, an actuator rod positioned in said tube and extending from the lower end thereof when said cradle is in inclined position, said stop and the upper end of said actuator rod having complementary cam means whereby when said cradle is pivoted to upright position and the lower end of said actuator rod abuts against the floor, said rod will be forced upwardly in said tube, thereby camming said stop out of the path of movement of said sleeve, and means associated with said sleeve and coacting with said tube to retain said sleeve in fixed position on said tube.

2. A hand truck comprising a cradle, wheels rotatably mounted at the lower end of said cradle, support means connected to said cradle and pivotally displaceable with respect thereto, wheel means on said support means, a track comprising a hollow tube extending longitudinally of said cradle and rigid therewith, a sleeve slidably mounted on said tube and operatively connected to said support means to displace the latter with respect to said cradle, whereby said cradle may be moved to an inclined position, a bushing rigidly mounted in said tube near the upper end thereof, said bushing having a tranverse bore therethrough aligned with an opening in said tube, and a vertical bore leading into said transverse bore, a safety stop slidably mounted in said transverse bore and having a cam conformation, resilient means in said transverse bore normally urging said safety stop therefrom into the path of movement of said sleeve, a bushing rigidly mounted in said tube near the lower end thereof and having a vertical bore therethrough, an actuator rod in said tube slidably mounted in said bushings in the bore thereof, and normally protruding beyond the lower end of said tube when said cradle is in inclined position, means to limit the downward movement of said actuator rod and a complementary cam conformation at the upper end of said actuator rod in engagement with the cam conformation on said safety stop whereby when said cradle is pivoted to upright position and the lower end of said actuator rod abuts against the floor, said rod will be forced upwardly, thereby camming said safety stop out of the path of movement of said sleeve.

3. The combination set forth in claim 2 in which the complementary cam conformation comprises a conical top at the upper end of said actuator rod and a conical depression in the underface of said safety stop.

4. The combination set forth in claim 2 in which means are provided to force said actuator rod downwardly in said tube.

5. A hand truck comprising a cradle, wheels rotatably mounted at the lower end of said cradle, support means connected to said cradle and pivotally displaceable with respect thereto, wheel means on said support means, a track comprising a hollow tube extending longitudinally of said cradle and rigid therewith, a sleeve slidably mounted on said tube and operatively connected to said support means to displace the latter with respect to said cradle, whereby said cradle may be moved to an inclined position, a safety stop normally positioned in said tube and movable therefrom at right angles thereto into the path of movement of said sleeve to limit the movement of the latter on said tube, means automatically actuated by pivoting the cradle from upright to inclined position to set said safety stop to operative position, and a latch pin slidably mounted in said sleeve at right angles thereto and normally urged thereinto toward said tube, said tube having an opening therethrough into which said latch pin may enter.

HENRY E. SCHUTZER.
RUDOLPH C. FROHNER.

REFERENCES CITED

The following references are of record in the file of this patent:

UNITED STATES PATENTS

| Number | Name | Date |
|---|---|---|
| 171,657 | French | Jan. 4, 1876 |
| 672,152 | Ruher | Apr. 16, 1901 |
| 1,358,235 | Nylin | Nov. 9, 1920 |
| 1,668,129 | Spaeth | May 1, 1928 |
| 1,719,763 | Gullborg | July 2, 1929 |
| 2,030,925 | Lea | Feb. 18, 1936 |
| 2,415,392 | Morehouse | Feb. 4, 1947 |